(12) United States Patent
Harrison et al.

(10) Patent No.: US 7,543,240 B2
(45) Date of Patent: Jun. 2, 2009

(54) CONSERVING SPACE ON BROWSER USER INTERFACES

(75) Inventors: Edward R. Harrison, Beaverton, OR (US); James W. Lundell, Portland, OR (US); Rochelle J. Keeler, Portland, OR (US); Alyson R. Miller, Portland, OR (US); Cindy L. Merrill, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 11/363,830

(22) Filed: Feb. 27, 2006

(65) Prior Publication Data

US 2006/0143573 A1 Jun. 29, 2006

Related U.S. Application Data

(62) Division of application No. 09/754,849, filed on Jan. 4, 2001, now Pat. No. 7,039,877.

(51) Int. Cl.
*G06F 3/048* (2006.01)

(52) U.S. Cl. .................................................. 715/779
(58) Field of Classification Search ................. 715/779, 715/781, 788, 790, 791, 792, 780, 799
See application file for complete search history.

(56) References Cited

U.S. PATENT DOCUMENTS

| 6,057,836 | A  | * | 5/2000 | Kavalam et al. | ............. | 715/779 |
| 6,429,846 | B2 | * | 8/2002 | Rosenberg et al. | .......... | 345/156 |
| 6,714,220 | B2 | * | 3/2004 | Sigl | ............................ | 715/780 |
| 7,114,128 | B2 | * | 9/2006 | Koppolu et al. | ............. | 715/781 |
| 7,149,982 | B1 | * | 12/2006 | Duperrouzel et al. | ....... | 715/788 |

* cited by examiner

*Primary Examiner*—Thanh T Vu
(74) *Attorney, Agent, or Firm*—Trop, Pruner & Hu, P.C.

(57) ABSTRACT

A user interface enables the display of browser information in a space conserving fashion. A plurality of icons may be displayed along a bar adjacent a browser display window. When an icon is selected, an appropriate panel may be displayed. A uniform resource locator text entry block may only be displayed when an appropriate icon is selected. Thus the extra space that is lost through the display of the text entry block is only encountered when the user actually needs to make a uniform resource locator text entry.

12 Claims, 5 Drawing Sheets

CONSERVING SPACE ON BROWSER USER INTERFACES

This application is a divisional of U.S. patent application Ser. No. 09/754,849, filed on Jan. 4, 2001, now U.S. Pat. No. 7039,877.

BACKGROUND

This relates generally to user interfaces for processor-based systems.

User interfaces for processor-based systems facilitate the entry of user selections for software resident on those processor-based systems. For example, a browser may include a user interface with a button bar and a uniform resource locator entry block. A web page may be displayed below the button bar and uniform resource locator entry block.

The need to conserve display space may be critical with devices that have relatively smaller displays. Such devices may include personal digital assistants, web tablets and other portable devices. In such cases, all the space on the display or user interface may be critical to efficient use of the device.

Generally, the larger the display, the more expensive is the display. This may be a particular issue with portable devices using liquid crystal displays. In addition, larger displays result in larger and heavier devices which may be a distinct disadvantage, particularly for portable devices.

Thus there is a need for better ways to conserve space on browser user interfaces.

DETAILED DESCRIPTION

Figure 1:
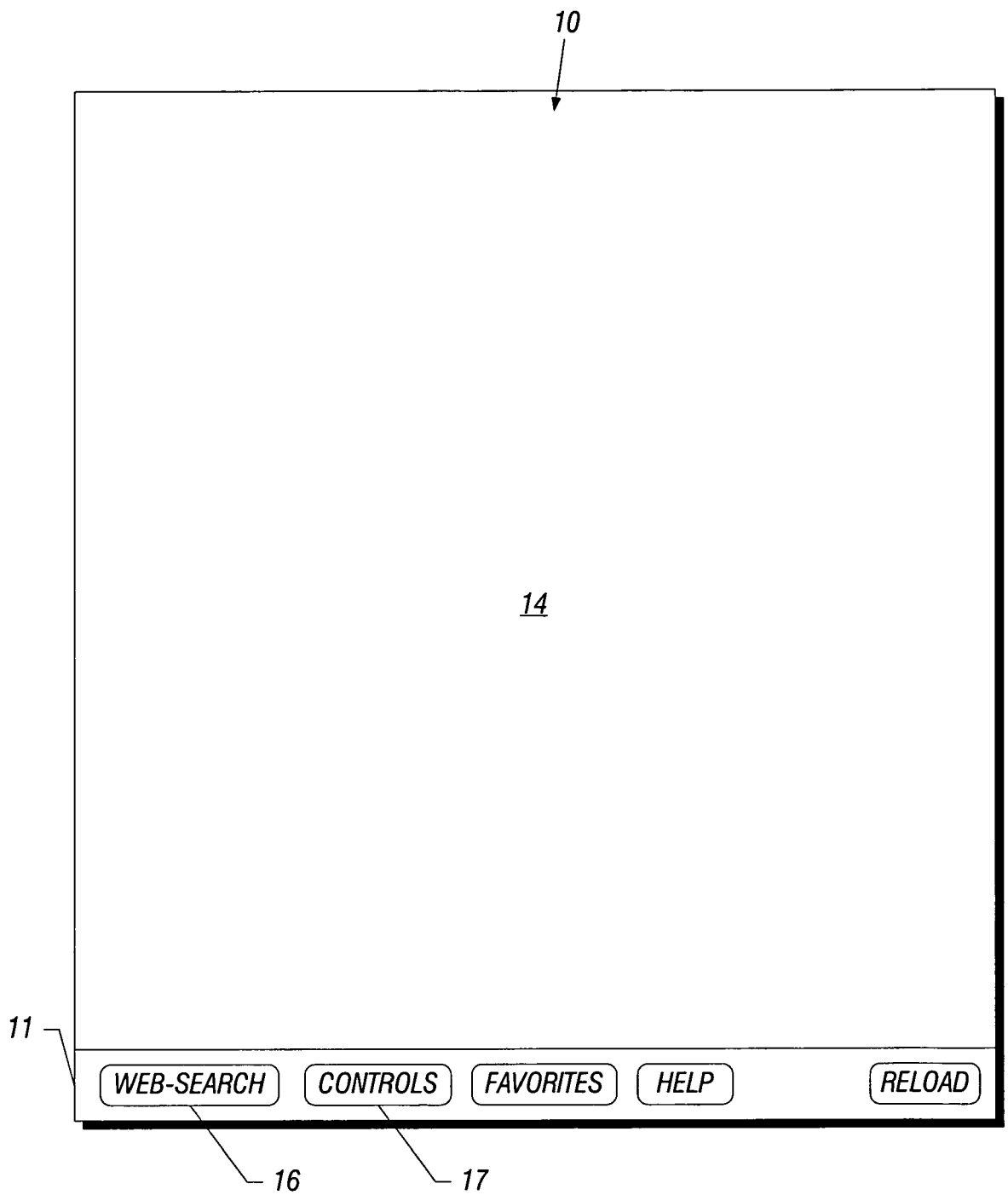
FIG. 1 is a depiction of a user interface in accordance with one embodiment of the present invention.

Referring to FIG. 1, a graphical user interface 10 may include a plurality of user selectable icons or images, called buttons herein, in a button bar 11. The user selectable buttons may include a web search button 16 and an audio button 17 in one embodiment. In this embodiment, there may be no persistently displayed uniform resource locator (URL) text entry block. A window 14 may display a selected web page or web search results as two examples.

Figure 2:
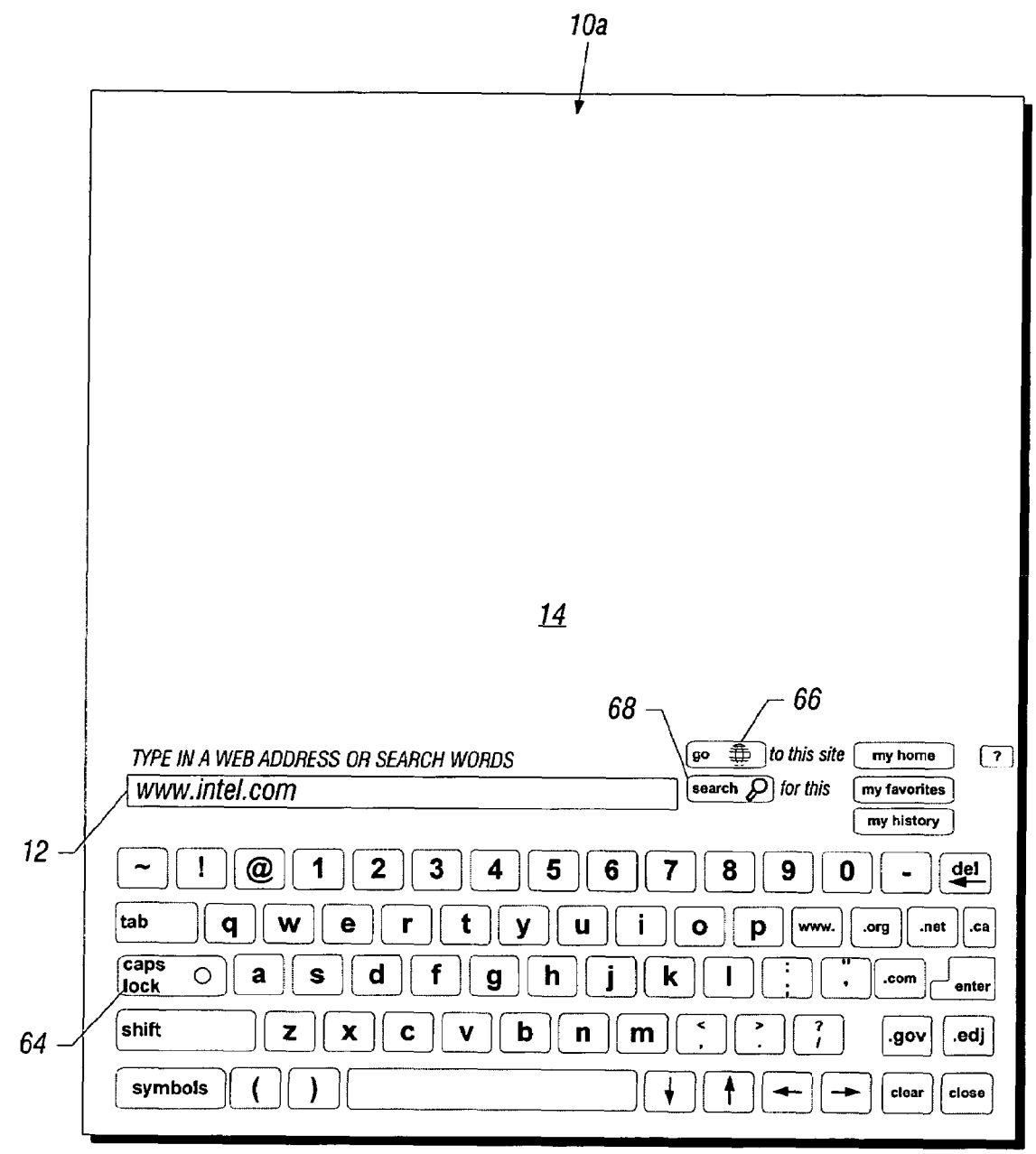
FIG. 2 is a depiction of a user interface of FIG. 1 after the web search button has been selected in accordance with one embodiment of the present invention.

When a user selects the button 16, for example, using a mouse or touch screen system, a uniform resource locator text entry block or panel 12 appears at the bottom of the window 14 in place of the button bar 11, as shown in FIG. 2. The entry block 12 facilitates the entry of an appropriate URL to access a desired web page or the entry of text for web searching in one embodiment. By causing the block 12 to appear only on request, user interface 10 area is saved. Thus, space may be conserved by only presenting the text entry block 12 on user request.

Referring to FIG. 2, a keyboard image 64 and text entry block 12 are displayed in place of the button bar 11 upon selection of the web search button 16. In one embodiment, the keyboard image 64 includes a plurality of soft keys that may be selected using touch contact. The text entry block 12 allows the user to enter a uniform resource locator (URL) and then to select the go button 67 to access a selected web site.

Figure 3:
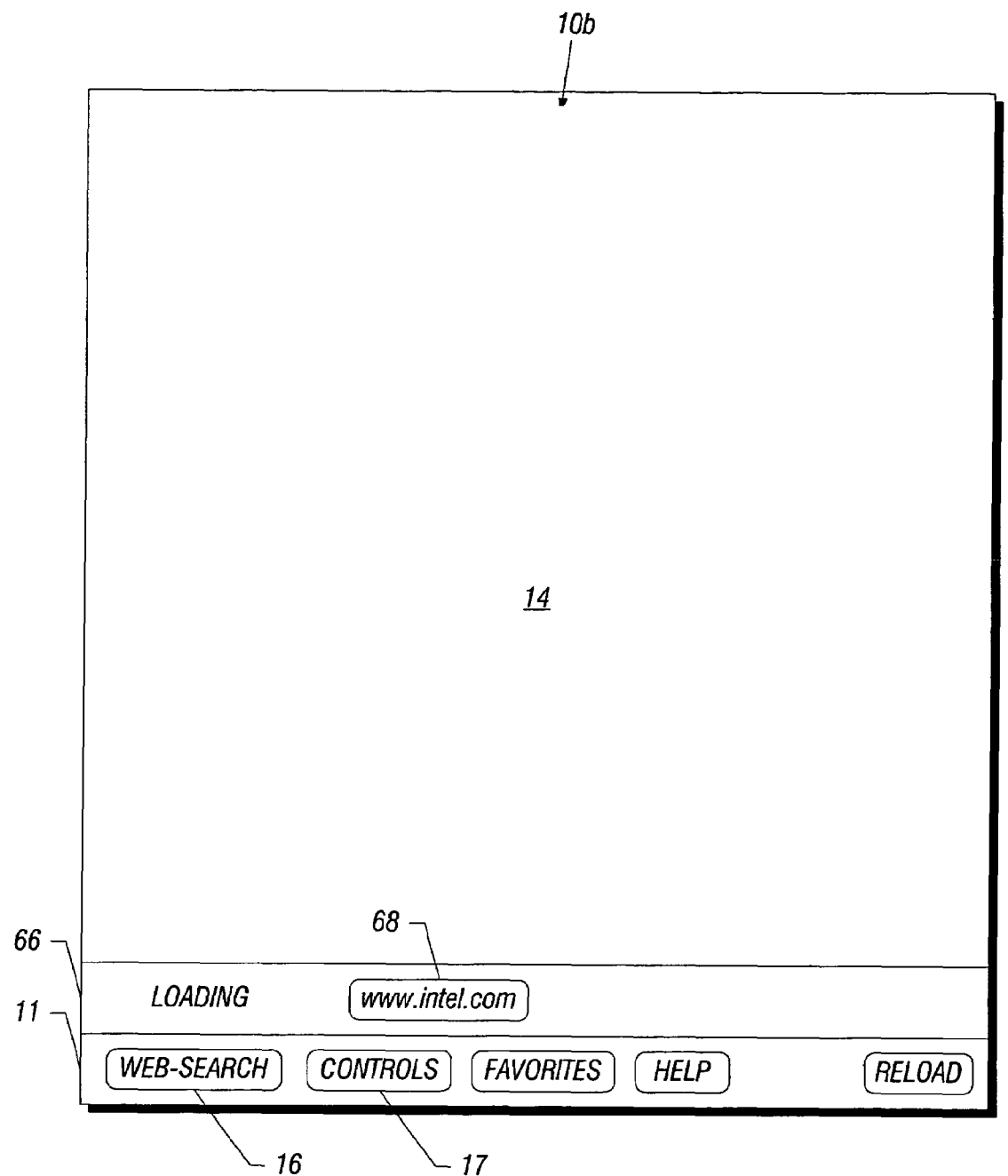
FIG. 3 is a depiction of a user interface of FIG. 1 after a URL has been entered in accordance with an embodiment of the present invention.

When the user enters a URL in the block 12 and presses the go button 67, the interface 10a (FIG. 2) changes to the interface lob shown in FIG. 3. A page loading bar 66 indicates that a selected web page, whose URL was entered in the block 68, is loading. The loading bar 66, over the button bar 11, replaces the keyboard image 64 and text entry block 12 user interface shown in FIG. 2, in one embodiment of the present invention. When the web page is finished loading, the web page may immediately appear in the window 14 and the loading bar 66 automatically disappears.

Figure 4:
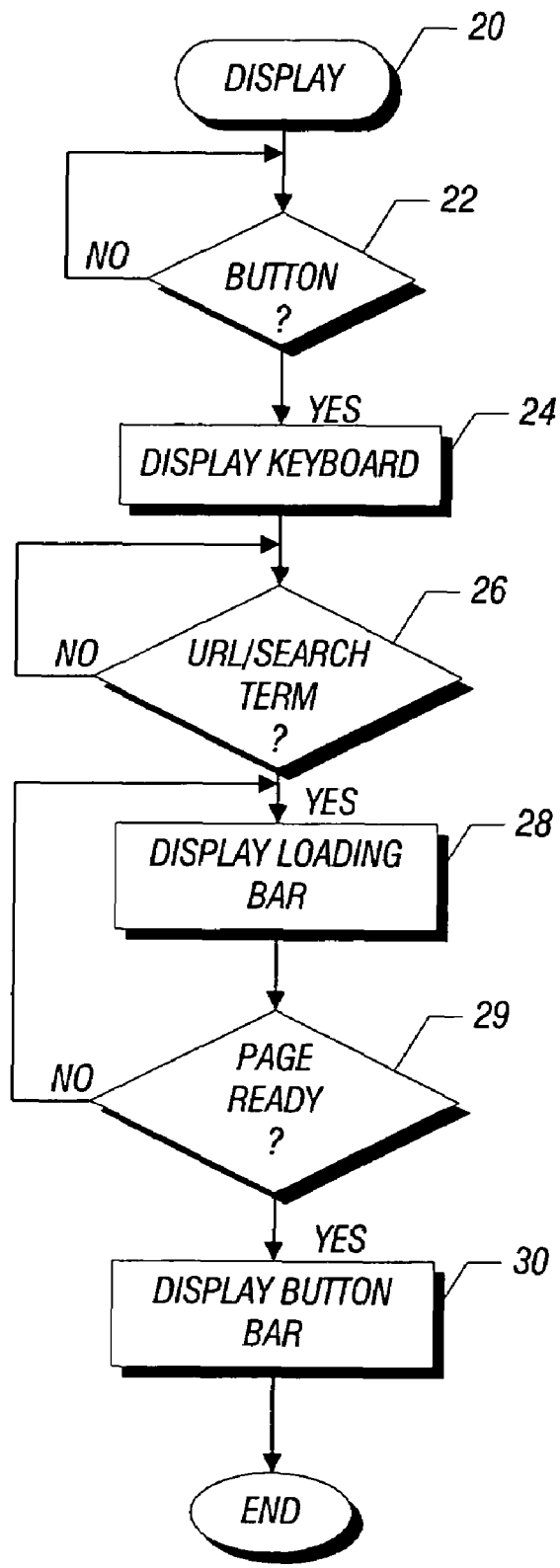
FIG. 4 is a flow chart for software resident on a processor-based system in accordance with one embodiment of the present invention.

Similarly, when the controls button 17 is selected in the button bar 11 in FIG. 1, the audio controls bar 13 is automatically displayed, stacked on top of the button bar 11 as shown in FIG. 4. Moreover, whenever music is being played, the audio bar 13 may be displayed in one embodiment. Thus, in FIG. 2 for example, if audio were being played, the audio bar 13 would be stacked on top of the soft keyboard image 64.

In this way, space may be conserved by causing dynamic informational bars or panels to transiently appear on an interface 10. For example, the button bar 11 is only displayed when it is needed. Similarly, the keyboard image 64 is only displayed when needed. As soon as a web page, selected using the image 64, begins to load, the image 64 is automatically replaced by the loading bar 66. Similarly, the loading bar 66 is transient in that it is automatically replaced by still another bar after the page is finished loading. In this embodiment, informational interfaces are not maintained on the display screen substantially longer than they are useful, increasing the period of time when a greater amount of display screen area is available.

If a user selects still another selectable button in the bar 11, such as the button 17, still another panel 13 may be displayed, stacked on top of the panel 12. Each time another button in the bar 11 is selected, another panel may be displayed, stacked on top of the previously displayed panels in one embodiment of the present invention. The more panels that are selected, the more the panels take from the display area of the page in the window 14. However, only those panels that are actually needed end up being displayed in one embodiment.

Turning to FIG. 4, the software for controlling the display of panels or bars, such as the bars 12 and 13 begins by determining whether a button has been selected (diamond 22) on the button bar 11.

When a button in the bar 11 is selected, a check at diamond 23 determines whether to display the bar 12, in one embodiment. If the web search button 16 is selected, then the keyboard image 64 is displayed as indicated in block 24. In one embodiment, the keyboard image 64 is displayed below the window 14, replacing the button bar 11 to conserve window 14 display area. A loading bar 66 is displayed, as indicated in block 28, in place of the keyboard image 64 when text is entered.

A check at diamond 29 determines whether the desired page (web page or search results page) is ready. If so, that page is displayed in the window 14 over the button bar 11 (that replaces the loading bar 66).

Figure 5:
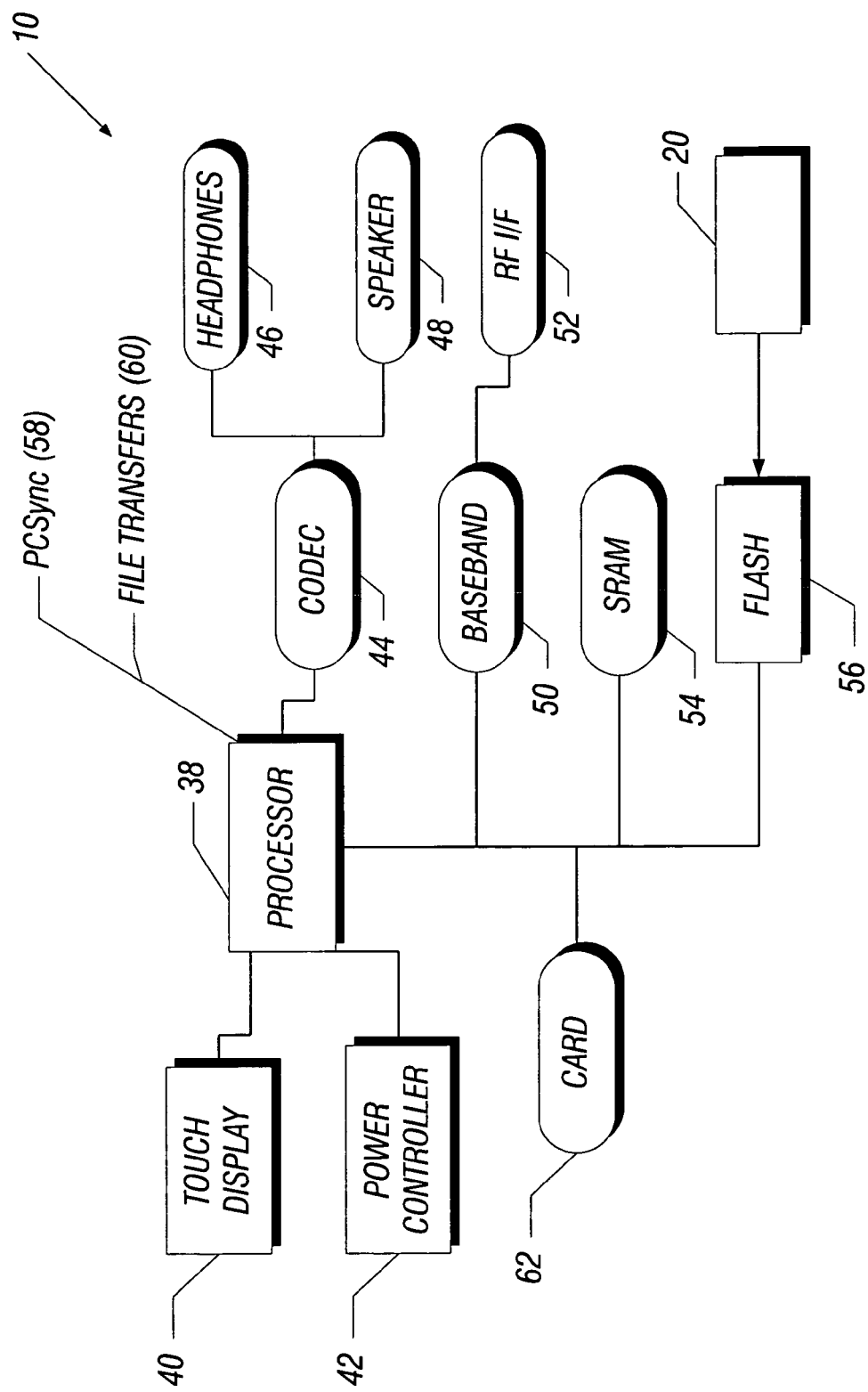
FIG. 5 is a block depiction of hardware in accordance with one embodiment of the present invention.

Finally, referring to FIG. 5, one embodiment of a processor-based system 36 to implement the present invention is illustrated. Of course, the present invention is not in any way limited to any particular hardware architecture or arrangement. The embodiment shown in FIG. 5 is simply an illustration of a wireless mobile processor-based device.

In the system 36, a processor 38 is coupled to a touch screen display 40 and a power controller 42. The processor 38, in one embodiment, may be the StrongARM brand processor available from Intel Corporation. The processor 38 may also communicate with a host processor-based system using sync signals 58 and file transfer signals 60. Thus, the system 36 may be synchronized by transferring data from the system 36 to a host system (not shown) such as a desktop computer or other processor-based system.

The processor 38 is also coupled to a coder/decoder or codec 44. The codec 44 provides an analog output signal to headphones 46 or speakers 48.

A baseband section 50 is coupled to a radio frequency interface 52 in one embodiment. The interface 52 may facilitate communications with a base station using a wireless protocol. This may be the case in a variety of portable devices including web tablets and personal digital assistants, as two examples. In other embodiments, the system 36 may be a standalone system, may communicate over a tethered cable with a base station, or may use other wireless techniques such as infrared technology.

The processor of 38 is also coupled to a static random access memory (SRAM) 54 and a flash memory 56 in one embodiment. In that embodiment, the stack software 20 may be stored in the flash memory 56. Of course, other types of storage devices, such as hard disk drives, may also be used in other applications. The processor 38 is also coupled to one or more peripheral cards 62.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   displaying a plurality of icons, including a uniform resource locator icon, along a bar on a user interface associated with a web browser;
   in response to the user's selection of the uniform resource locator icon, displaying a uniform resource locator text entry area and a keyboard image in place of said bar; and
   in response to input of a uniform resource locator, automatically displaying said bar and a page loading bar in place of said text entry area and said keyboard image.

2. The method of claim 1 including displaying said bar along a window and displaying a web page in said window.

3. The method of claim 2 including positioning said uniform resource locator text entry area in said window.

4. The method of claim 2 including displaying panels selected using said icons one on top of another within said window.

5. An article comprising a medium storing instructions that enable a processor-based system to:
   display a plurality of icons, including a uniform resource locator icon, along a bar on a user interface associated with a web browser;
   in response to the user's selection of the uniform resource locator icon, display a uniform resource locator text entry area and a keyboard image in place of said bar; and
   in response to input of a uniform resource locator, automatically display said bar and a page loading bar in place of said text entry area and said keyboard image.

6. The article of claim 5 further storing instructions that enable the processor-based system to display the bar above a window and display a web page in the window.

7. The article of claim 6 further storing instructions that enable the processor-based system to position a uniform resource locator text entry area in the window.

8. The article of claim 6 further storing instructions that enable the processor-based system to display panels selected using the icons one on top of another within the window.

9. A system comprising:
   a processor; and
   a storage coupled to said processor, said storage storing instructions that enable the processor to display a plurality of icons, including a uniform resource locator icon, along a bar on a user interface associated with a web browser and, in response to the user's selection of the uniform resource locator icon, display a uniform resource locator text entry area and a keyboard image in place of said bar, and in response to input of a uniform resource locator, automatically display said bar and a page loading bar in place of said text entry area and said keyboard image.

10. The system of claim 9 wherein said system is battery powered.

11. The system of claim 9 wherein said storage stores instructions that enable the processor to display the bar above a window and display a web page in the window.

12. The system of claim 11 wherein said storage stores instructions that enable the processor to position the uniform resource locator text entry area in the window.

* * * * *